(12) United States Patent
Nelson

(10) Patent No.: US 11,633,976 B2
(45) Date of Patent: Apr. 25, 2023

(54) VEHICULAR WHEEL HAVING A SPOKE DEFINING A HOLLOW CHAMBER AND VEHICLES INCLUDING SAME

(71) Applicant: HONDA MOTOR CO., LTD., Tokyo (JP)

(72) Inventor: Joseph Nelson, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 475 days.

(21) Appl. No.: 16/854,542

(22) Filed: Apr. 21, 2020

(65) Prior Publication Data

US 2020/0346487 A1  Nov. 5, 2020

Related U.S. Application Data

(60) Provisional application No. 62/840,998, filed on Apr. 30, 2019.

(51) Int. Cl.
| | | |
|---|---|---|
| *B60B 3/10* | (2006.01) | |
| *B60B 3/00* | (2006.01) | |
| *B60B 3/04* | (2006.01) | |
| *B60B 1/02* | (2006.01) | |
| *B60B 21/06* | (2006.01) | |
| *B60B 1/04* | (2006.01) | |

(52) U.S. Cl.
CPC ............... *B60B 3/10* (2013.01); *B60B 3/007* (2013.01); *B60B 3/04* (2013.01); *B60B 1/0253* (2013.01); *B60B 1/042* (2013.01); *B60B 1/043* (2013.01); *B60B 21/06* (2013.01); *B60B 2310/202* (2013.01)

(58) Field of Classification Search
CPC .. B60B 3/04; B60B 3/041; B60B 3/10; B60B 3/007; B60B 1/0253; B60B 1/042; B60B 1/043

See application file for complete search history.

(56) References Cited

U.S. PATENT DOCUMENTS

| | | |
|---|---|---|
| 4,610,482 A | 9/1986 | Overbeck et al. |
| 5,313,996 A | 5/1994 | Bragg |
| 5,538,329 A | 7/1996 | Stach |
| 5,564,792 A | 10/1996 | Archibald |
| 5,641,208 A | 6/1997 | Stach |
| 6,024,415 A | 2/2000 | Stach |
| 6,106,075 A | 8/2000 | Suenaga |
| 6,231,129 B1 | 5/2001 | Stach |

(Continued)

FOREIGN PATENT DOCUMENTS

| | | | | |
|---|---|---|---|---|
| DE | 19634535-01 | * | 8/1997 | ............... B22C 9/28 |
| EP | 0936083 A2 | * | 8/1999 | ............... B60B 3/10 |

(Continued)

*Primary Examiner* — Jason R Bellinger
(74) *Attorney, Agent, or Firm* — ArentFox Schiff LLP

(57) ABSTRACT

A vehicular wheel assembly defines an axis of rotation and includes a wheel having an inner hub, an outer rim, and a plurality of hollow spokes. The outer rim defines an outer circumference. Each hollow spoke of the plurality of hollow spokes extends between the inner hub and the outer rim and includes a wall that at least partially defines a hollow chamber. The outer rim defines a plurality of openings that are each in fluid communication with one of the hollow chambers and each of the openings includes a tuning member.

20 Claims, 17 Drawing Sheets

(56) References Cited

U.S. PATENT DOCUMENTS

| | | |
|---|---|---|
| 6,234,581 B1 | 5/2001 | Stach |
| 6,309,026 B1 | 10/2001 | Svedhem |
| 6,312,059 B1 | 11/2001 | Stach |
| 6,325,462 B1 | 12/2001 | Hummel et al. |
| 6,364,425 B1 | 4/2002 | Marquis |
| 6,516,849 B2 | 2/2003 | Flament et al. |
| 6,758,533 B1 | 7/2004 | Hummel et al. |
| 6,837,549 B2 | 1/2005 | Ito et al. |
| 7,013,940 B2 | 3/2006 | Tsihlas |
| 7,152,643 B2 | 12/2006 | Morinaga et al. |
| 7,487,668 B2 | 2/2009 | Aoki |
| 7,694,706 B2 | 4/2010 | Ikeda et al. |
| 7,976,107 B2 | 7/2011 | Okada et al. |
| 8,231,180 B2 | 7/2012 | Coleman et al. |
| 8,286,679 B2 | 10/2012 | Kamiyama et al. |
| 2008/0164750 A1 | 7/2008 | Vanetta |
| 2010/0123350 A1 | 5/2010 | McNeill |
| 2014/0116593 A1 | 5/2014 | Lucaora |

FOREIGN PATENT DOCUMENTS

| | | | | |
|---|---|---|---|---|
| JP | 2004090669 A | | 3/2004 | |
| JP | 2006231966 A | | 9/2006 | |
| JP | 2007326533 A | * | 12/2007 | ............... B60B 3/04 |
| JP | 2009029348 A | | 2/2009 | |
| JP | 2011173479 A | | 9/2011 | |
| JP | 2012171459 A | | 9/2012 | |
| KR | 20220010881 A | * | 1/2022 | ........... B60B 21/026 |

* cited by examiner

VEHICULAR WHEEL HAVING A SPOKE DEFINING A HOLLOW CHAMBER AND VEHICLES INCLUDING SAME

CROSS-REFERENCE TO RELATED APPLICATION

This application claims the benefit of U.S. Provisional Application Ser. No. 62/840,998, entitled "VEHICULAR WHEEL HAVING A SPOKE DEFINING A HOLLOW CHAMBER, RESONATOR DEVICES AND VEHICLES INCLUDING SAME" and filed on Apr. 30, 2019, which is expressly incorporated by reference herein in its entirety.

BACKGROUND

In vehicular wheel assemblies it is generally advantageous to decrease wheel and unsprung mass in general for improvements in efficiency, grip, and response over irregular road surfaces. A reduction in unsprung mass or, more specifically, wheel mass, however, may have some negative effects such as a decrease in isolation of high and mid frequency road noise and vibration. Further, during the operation of a vehicle, the air inside a tire can generate road noise which can resonate through the wheels and into the passenger compartment, thereby disturbing occupants of the vehicle. To attenuate the transmission of road noise and vibrations into the passenger compartment, the wheels may be provided with resonance devices. These conventional resonance devices are oftentimes bulky, expensive, and can adversely affect the mass of the wheels.

SUMMARY

In accordance with one aspect, a vehicular wheel assembly defines an axis of rotation and comprises a wheel that includes an inner hub, an outer rim and a plurality of hollow spokes. The outer rim defines an outer circumference. Each hollow spoke of the plurality of hollow spokes extends between the inner hub and the outer rim and comprises a wall that at least partially defines a hollow chamber. The outer rim defines a plurality of openings that are each in fluid communication with at least one of the hollow chambers. Each of the inner hub, the outer rim, and the plurality of hollow spokes may be formed of a metal material as an as-cast one-piece construction.

In accordance with another aspect, a vehicular wheel assembly defines an axis of rotation and comprises a wheel, including an inner hub, an outer rim a plurality of hollow spokes, and a plurality of tuning members. Each hollow spoke of the plurality of hollow spokes extends between the inner hub and the outer rim. Each tuning member of the plurality of tuning members comprises a body that defines at least one through hole and comprises a wall that at least partially defines a hollow chamber. The outer rim defines a plurality of openings that are each in fluid communication with one of the hollow chambers. Each tuning member is releasably or permanently coupled with the outer rim at one of the openings such that each of said at least one through holes of each tuning member is in fluid communication with one of the hollow chambers by way of one of the openings. Each of the inner hub, the outer rim, and the plurality of hollow spokes are formed of a first material. Each tuning member is formed of a second material that may be different from the first material. Each of the openings defines a diameter. Each of said at least one through holes defines a through hole diameter. The ratio of the through hole diameter of each of the tuning members to the diameter of the opening associated with each tuning member may be about 1:10 or more.

In accordance with one aspect, a chamber having a tuning member releasably coupled and in fluid communication with the hollow spoke through the opening is advantageous for tuning the resonance properties of the tuning member and/or hollow chamber.

In accordance with one aspect, a vehicular wheel assembly defines an axis of rotation and comprises a wheel including an inner hub, an outer rim defining an outer circumference, and a plurality of hollow spokes. Each hollow spoke of the plurality of hollow spokes extends between the inner hub and the outer rim, and the outer rim defines a plurality of openings that are each in fluid communication with one of the hollow chambers. The plurality of hollow spokes comprises a first spoke comprising a first wall that defines a first hollow chamber, and a second spoke comprising a second wall that defines a second hollow chamber. The first spoke and the second spoke intersect at a junction such that the first hollow chamber and the second hollow chamber are in fluid communication with each other at the junction, and the junction is disposed between the outer rim and the axis of rotation. Each of the inner hub, the outer rim, and the plurality of hollow spokes may be comprised of a metal material as an as-cast one-piece construction.

Optionally, at least a portion of the junction may is disposed between the inner hub and the outer rim. The junction may be more proximate to the inner hub than the outer rim. The first spoke and the second spoke may be spaced apart at the outer rim portion and converge at the junction such that the first spoke and the second spoke are substantially V-shaped.

Optionally, each of the plurality of openings is configured to receive a tuning member, each tuning member comprising a body that defines at least one through hole, and each tuning member is coupled with the outer rim at one of the plurality of openings such that each of the at least one through holes of each tuning member is in fluid communication with one of the hollow chambers by way of one of the openings. A first opening of the plurality of openings may be in fluid communication with the first spoke, a second opening of the plurality of openings may be in fluid communication with the second spoke, a first tuning member may be installed into the first opening, and a second tuning member may be installed into the second opening, so that the first tuning member, the second tuning member, the first hollow chamber and the second hollow chamber at least partially define a Helmholtz resonator. Each tuning member may comprise a body that includes an inner surface and an outer surface, the body defining the at least one through hole, and a portion of the inner surface of the body engages the wall to at least partially form a sealed perimeter around the opening.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

In general, a wheel assembly is provided with a Helmholtz resonator at least partially defined by a hollow chamber defined by a spoke and a tuning member. The tuning member at least partially defines a through hole that is in fluid communication with the hollow chamber.

Figure 1:
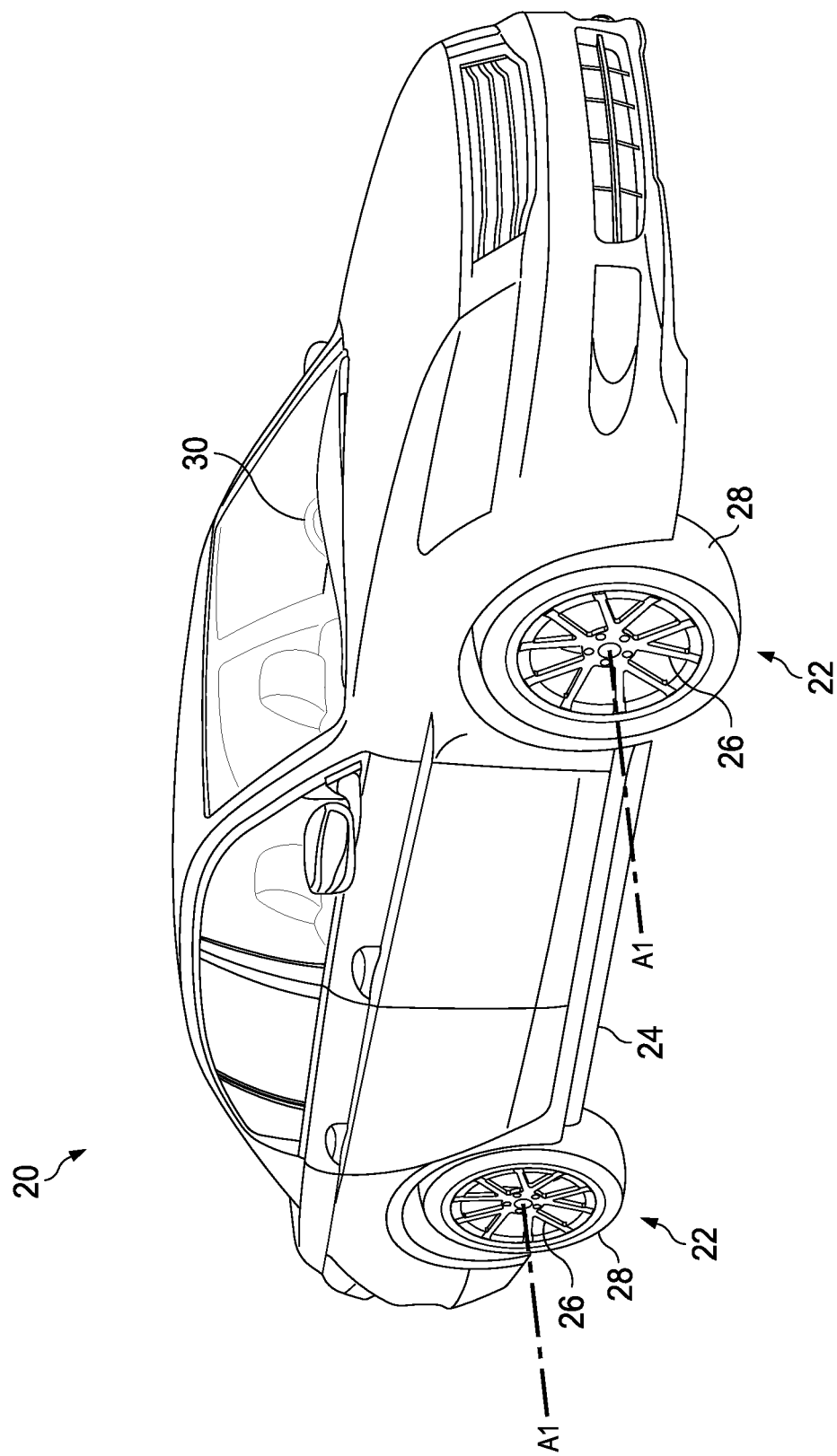
FIG. 1 is a front perspective view depicting an example vehicle that includes a plurality of wheels.

In connection with the views and examples of FIGS. 1-9, wherein like numbers indicate the same or corresponding elements throughout the views, FIG. 1 illustrates a vehicle 20. The vehicle 20 is shown in FIG. 1 to comprise an automobile. However, a vehicle in accordance with alternative aspects can comprise a sport-utility vehicle ("SUV"), a truck, a van, a cross-over type vehicle ("CUV"), or any of a variety of other suitable vehicles, such as a recreational vehicle or a utility vehicle, for example. As illustrated in FIG. 1, the vehicle 20 may comprise a plurality of wheel assemblies 22 that are rotatably coupled with a vehicular frame 24. Each of the wheel assemblies 22 may include a wheel 26 and a tire 28 coupled to the wheel 26. The vehicle 20 may include a steering wheel 30 that can facilitate pivoting of the wheel assemblies 22 (e.g., front wheel assemblies and/or rear wheel assemblies) to steer the vehicle 20. An engine (not shown) may be coupled with a transmission (not shown) and may provide motive power to the transmission to facilitate driving of at least one of the wheel assemblies 22. Each of the wheels 26 can define a respective axis of rotation A1.

Figure 2A:
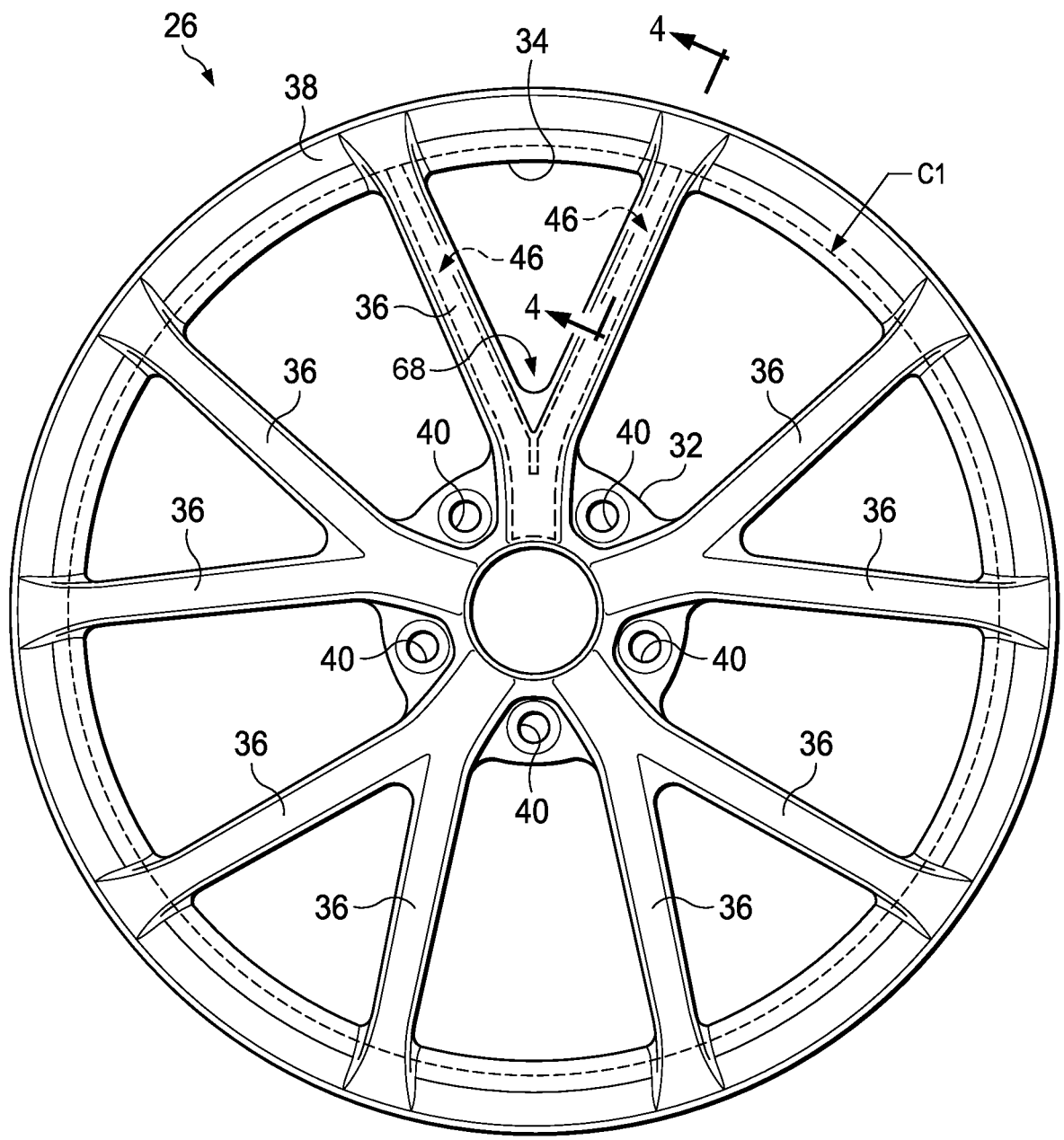
FIG. 2A is a plan view depicting one of the wheels of the vehicle of FIG. 1, in accordance with one aspect of the present disclosure.
Figure 2B:
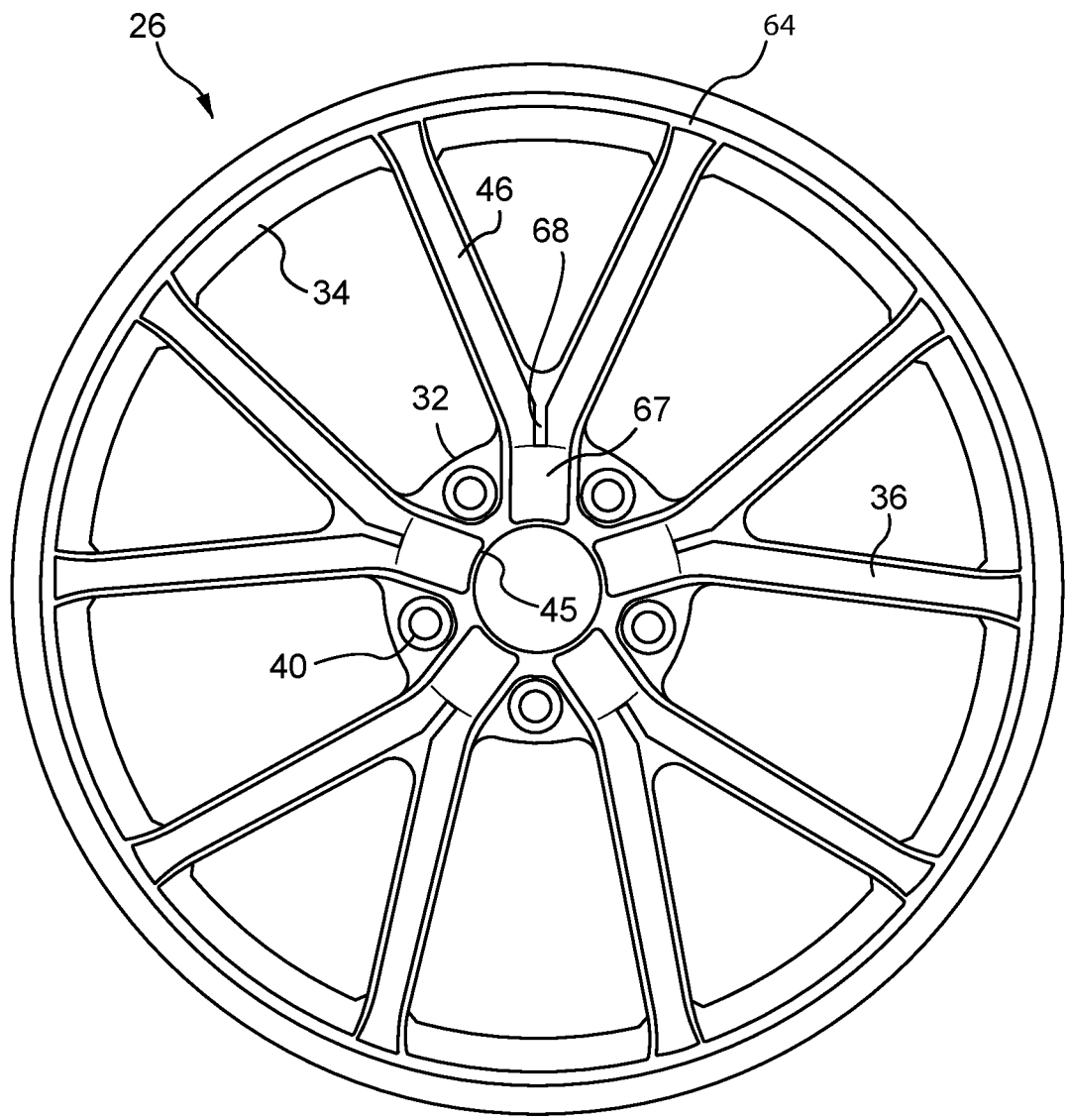
FIG. 2B is a cut away view depicting the wheel in FIG. 2A, in accordance with one aspect of the present disclosure.
Figure 3A:
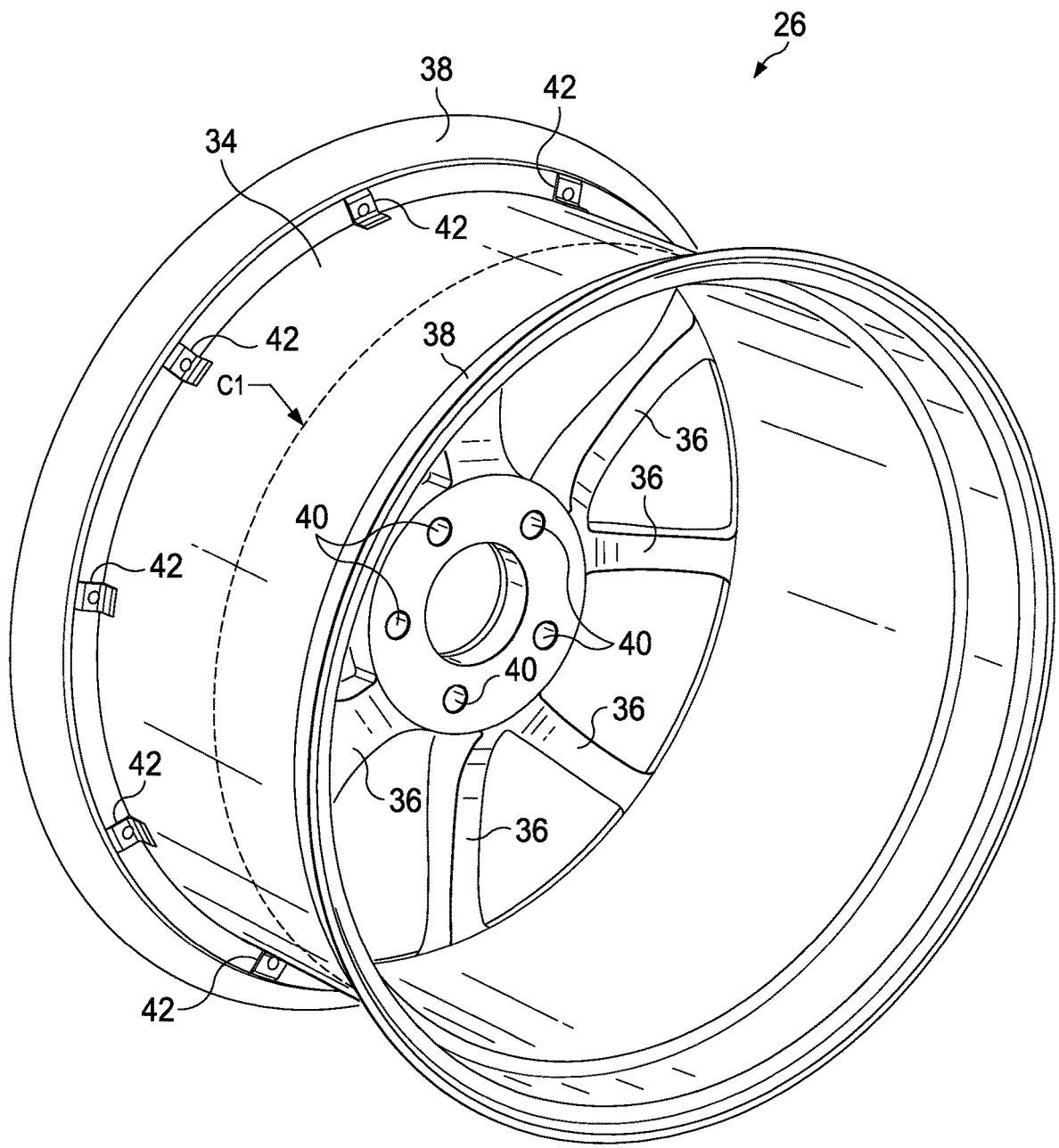
FIG. 3A is a perspective view depicting the wheel of FIG. 2A, wherein the wheel is shown to include a plurality of tuning members disposed about a circumference of the wheel, in accordance with one aspect of the present disclosure.
Figure 3B:
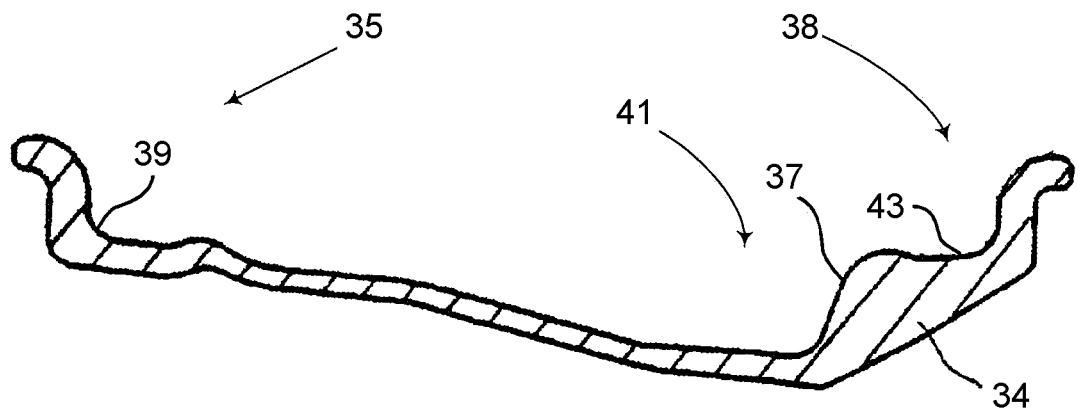
FIG. 3B is a cut away view of a wheel rim, in accordance with one aspect of the present disclosure.

Referring now to FIGS. 2A-B and 3A-C, one of the wheels 26 is depicted and is shown to include an inner hub 32, an outer rim 34, and a plurality of spokes 36 that extend between the inner hub 32 and the outer rim 34. The outer rim 34 may define an outer circumference Cl of the wheel 26. As illustrated in FIGS. 3A and 3B, the outer rim 34 may include an outboard flange 38 including an outboard bead seat 43 and an inboard flange 35 including an inboard bead seat 39 that are configured to interact with the tire 28 (FIGS. 3C, 4A, and 4B) to facilitate an effective seal therebetween. The outer rim 34 also includes a drop well 41 positioned inboard of the outboard flange 38, and an outboard wall 37 positioned inboard of the outboard bead seat 43 that extends from the outboard bead seat 43 to the drop well 41. The inner hub 32 may define a plurality of lug holes 40 that may accommodate lugs (e.g., lug bolts or lug studs) (not shown) that facilitate releasable fastening of the wheel 26 to a wheel hub (not shown). As illustrated in FIG. 3A, the wheel 26 may include a plurality of tuning members 42 that may be releasably coupled with the outer rim 34 along the outer circumference Cl of the outer rim 34.

Figure 4A:
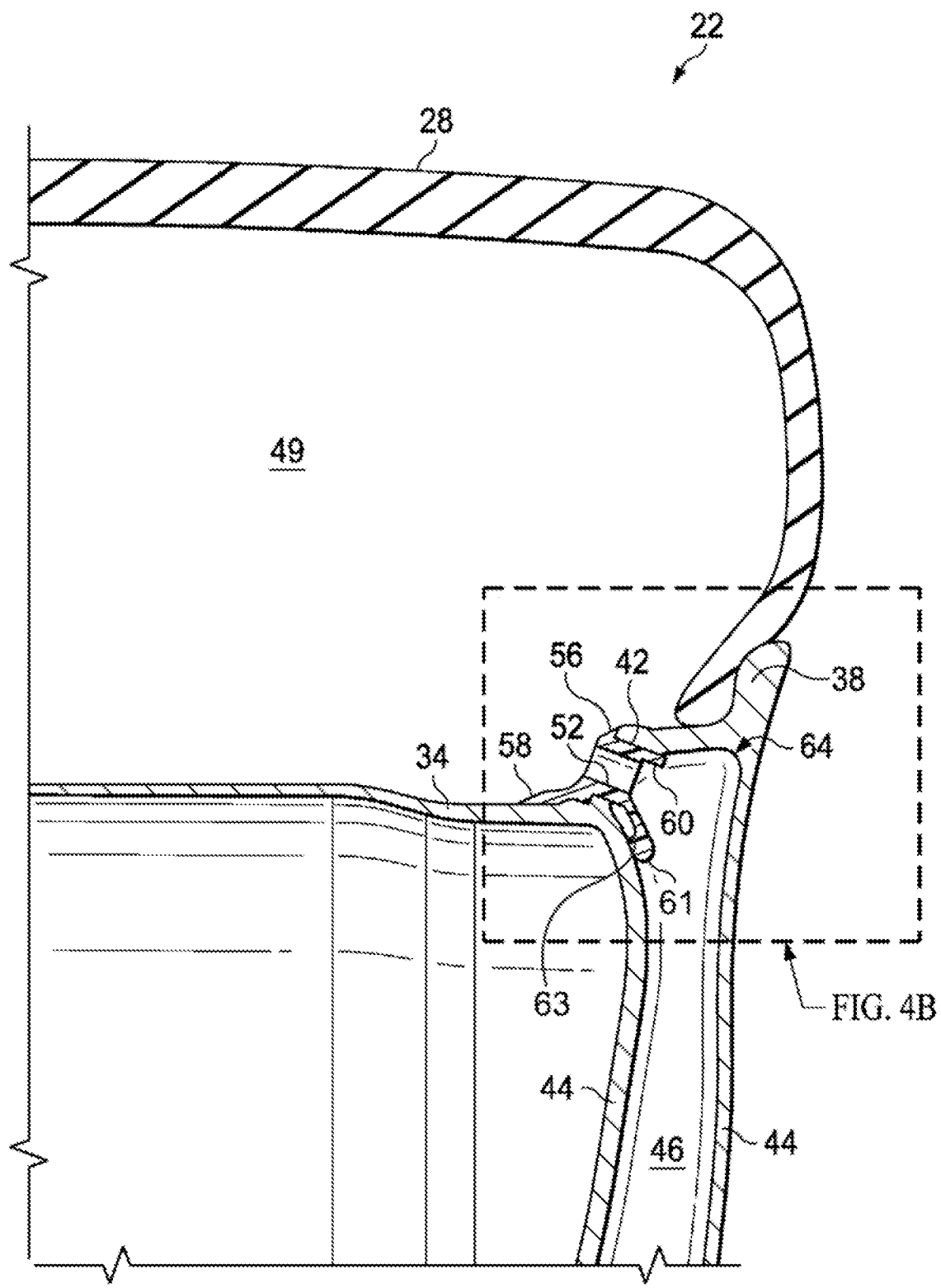
FIG. 4A is a cross-sectional view taken along the line 4-4 of FIG. 2A.
Figure 4B:
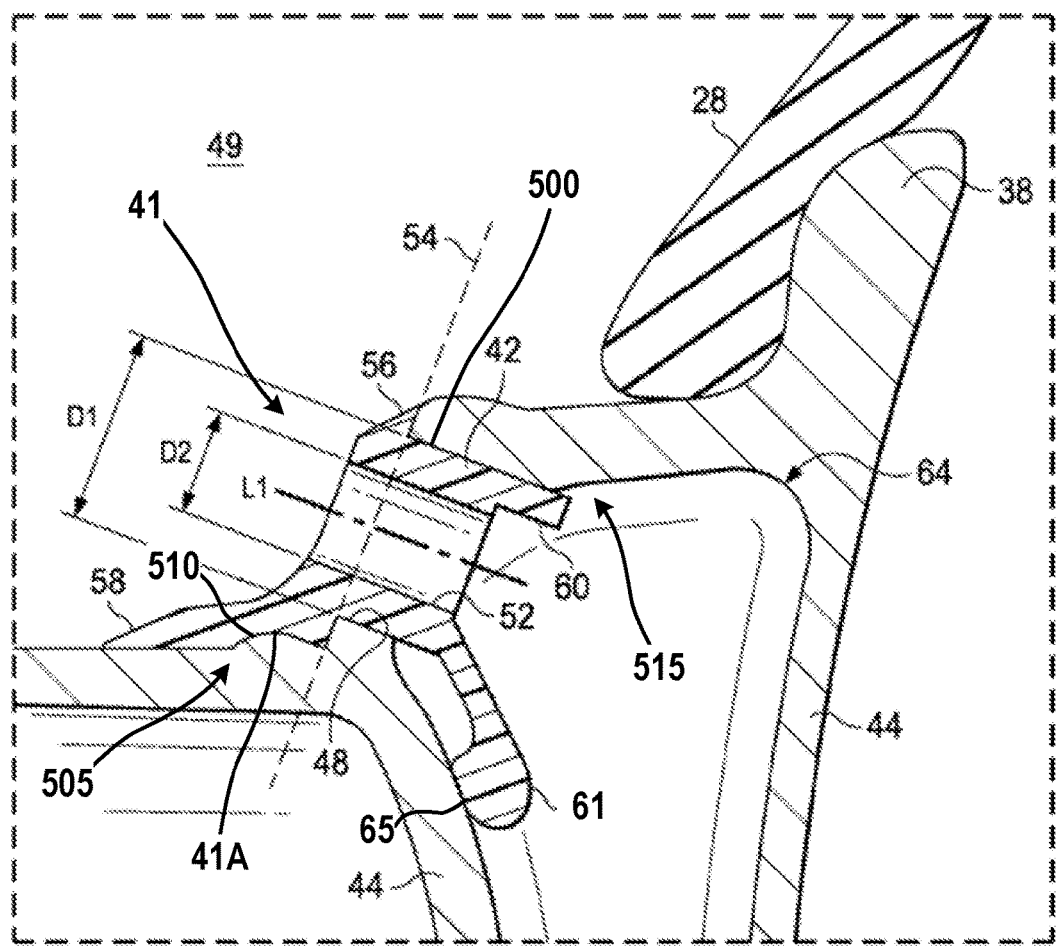
FIG. 4B is an enlarged view of the encircled portion of FIG. 4A.

Referring now to FIGS. 4A and 4B, one of the spokes 36 is depicted and may be representative of each of the remaining spokes 36 of the wheel 26. The spoke 36 is shown to include a wall 44. The wall 44 may define a hollow chamber 46 such that the spoke 36 is hollow. The outer rim 34 may define an opening 48 that is in fluid communication with the hollow chamber 46. The tuning member 42 may be at least partially inserted into the opening 48 such that the outer rim 34 and the tuning member 42 are coupled together at the opening 48. The tire 28 and the outer rim 34 may define a pressurized air chamber 49.

Figure 5:
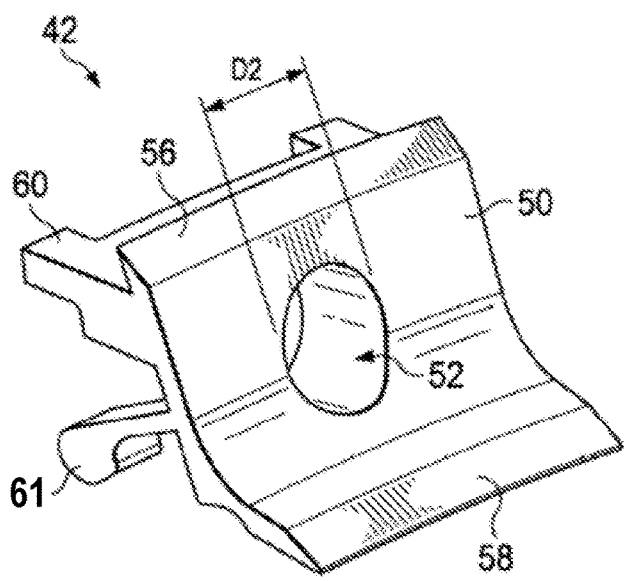
FIG. 5 is a front perspective view depicting a tuning member of the wheel of FIG. 3A, in accordance with one aspect of the present disclosure.

Referring now to FIGS. 4A-6, the tuning member 42 is positioned on the wheel assembly 22 to obstruct the opening 48 to at least partially define one or more through holes 52 that has or have a smaller cross sectional area than the opening 48. As shown in FIGS. 4A, 4B, and 5, the through hole 52 may be entirely defined by a body 50 of the tuning member 42. When the wheel assembly is assembled, the one or more through holes 52 are in fluid communication with the hollow chamber 46 and the pressurized air chamber 49. As illustrated in FIG. 4B, the opening 48 can define a diameter D1 and the through hole 52 can define a diameter D2. The ratio of the diameter D2 of the through hole 52 of the tuning member 42 to the diameter D1 of the opening 48 can be about 1:20 to approximately 1:2. It is to be appreciated that the opening 48 and through hole 52 can be any suitable shape, such as circular, diamond-shaped, oval-shaped, octagonal-shaped, triangular-shaped, square-shaped, rectangular shaped, or otherwise irregularly shaped. For example, in the abovementioned configurations, the diameter can be understood to mean the maximum distance measured across the opening 48 or through hole 52 and through its center. It is also to be appreciated that the diameter of the opening 48 can be understood to be measured from the outermost point (e.g., furthest away from the inner hub 32) at which the tuning member 42 interacts with the opening 48 (illustrated at line 54 in FIG. 4B).

The pressurized chamber 49 is in fluid communication with the hollow chamber 46 of the spoke 36 (e.g., via the through hole 52 of the tuning member 42). The tuning member 42 and the hollow chamber 46 at least partially defined by the spoke 36 at least partially define a Helmholtz resonator that effectively attenuates road noise generated during operation of the vehicle 20. The tuning member 42 may be tuned through variation of any one of a length of the through hole, width of the through hole, volume of the through hole and/or shape (e.g., the through hole 52 can be sized and/or configured relative to the hollow chamber 46) to effectively attenuate the resonance frequencies generated within the pressurized chamber 49 which might otherwise have an adverse effect on road noise.

While not limited as such, Helmholtz resonators can include a neck portion (the portions of the tuning member defining the through hole 52) and a cavity (the hollow chamber 46 at least partially defined by the spoke 36). The resonance frequency of a Helmholtz resonator is dependent on the static pressure in the cavity, the geometry of the neck portion and the volume of the cavity. By altering various geometries of the neck (for example: the diameter, length, and shape) it is possible to alter the range of frequencies which can be effectively attenuated. Based on general, non-limiting principles, the resonance frequency f of a Helmholtz resonator may be found through the following formula (Formula 1):

$$f = \frac{C}{2\pi}\sqrt{\frac{S}{R'V}},\qquad\text{(Formula 1)}$$

where c is the speed of sound, s is a cross sectional area of the neck portion (e.g. D2) and v is the volume of the cavity (e.g. hollow chamber 46). R' in the equation above may be the effective length of the neck which is represented by the following formula (Formula 2):

$$R'=R+0.3D,\qquad\text{(Formula 2)}$$

where R is the actual length of the neck portion and D is a hydraulic diameter of the neck portion. Based on the above principles, the through hole 52 and/or hollow chamber 46 may be tuned to attenuate a range of resonance frequencies generated within the pressurized chamber 49 which might otherwise have an adverse effect on road noise.

As shown in FIGS. 4A and 4B, the opening 48 may be defined by the outboard wall 37 of the outer rim 34, and the body 50 of the tuning member 42 includes an inner surface 500 (See FIGS. 5 and 6) that sealingly engage at least a portion of the wall 37 surrounding the opening 48. It is to be understood that an adhesive or sealant may be applied between the inner surface 500 and the outboard wall 37 to improve the performance of the seal therebetween. The tuning member 42 may include a base 505 extending inboardly from the body 50. The base 505 includes an inner surface 510 that sealingly engages a portion 41A of the drop well 41. Referring to FIG. 5, the tuning member 42 may include an upper flange 56 and a lower flange 58. The upper and lower flanges 56, 58 may be configured to be contoured to the adjacent surfaces when the tuning member 42 is inserted into the opening 48, as illustrated in FIGS. 4A and 4B.

Figure 6:
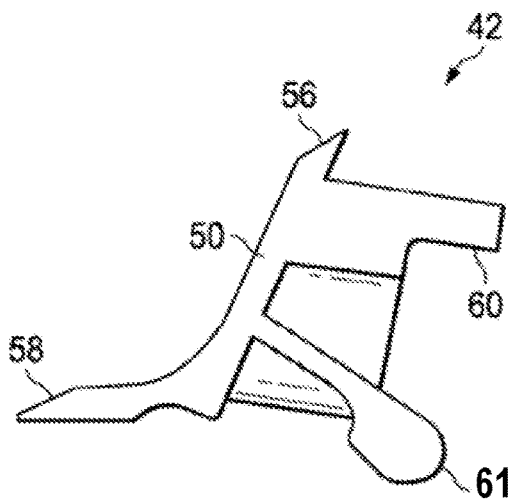
FIG. 6 is a side view depicting the tuning member of FIG. 5.

Referring to FIGS. 5 and 6, the tuning member 42 can include an outer tab 60 and inner tab 61 that extend from the body 50 and facilitate releasable coupling of the tuning member 42 to the outer rim 34. Either one of or both of the outer and inner tabs 60, 61 may include a locking feature 63. The locking feature 63 may extend radially outward from abovementioned tabs 60 and/or 61. As illustrated in FIGS. 4A and 4B, the locking feature 63 and/or tabs may interact with, for example, an inner wall of the spoke 36 or outer flange 35 to facilitate retention of the tuning member 42 thereto. In one aspect, the tabs 60 and 61 may be angled with respect to each other such that, when the tuning member 42 is inserted into the opening 48, the tabs 60 and 61 may exert an outward force upon the adjacent wall to hold the tuning member 42 in place. Further, the locking feature 63, which may be located on either one of or both of tabs 60 and 61, may be angled with respect to each other such that, when the tuning member 42 is inserted into the opening 48, the locking features 63 located on either one of or both of the outer and inner tabs 60 and 61 may exert an outward force upon the wall 44 to hold the tuning member 42 in place. In a non-limiting example, the outer tab 60 may be a fixed locating feature that extends from the inner surface 500 along an inner wall 515 of the outboard flange 38, and the inner tab 61 may be thinner than the outer tab 60 so that it is a flexible member that extends from the inner surface 500 that engages a wall portion 65 of the hollow chamber 46 to bias the outer tab 60 against the inner wall of the outboard flange 38.

The tuning member 42 can be formed of, but is not limited to, a thermoplastic material, such as polyvinylchloride, for example, an elastomeric material, such as rubber, for example, or any of a variety of suitable alternative non-metallic or metallic materials. The tuning member 42 may further be attached to the outer rim 34 through use of a bonding agent or an adhesive.

Referring again to FIG. 2A, the plurality of spokes 36 may be arranged in V-shaped pairs. The spokes 36 of each V-shaped pair may be spaced from each other at the outer rim 34 and may intersect with each other at a junction 68 such that the hollow chambers 46 of the V-shaped pair of spokes 36 may be in fluid communication with each other at the junction 68. The junction 68 may be understood to be the portion of the wheel 26 where the two spokes 36 converge and through which the hollow chambers 46 are in fluid communication. The junction 68 is shown to be disposed between the outer rim 34 and the axis of rotation and more proximate to the inner hub 32 than the outer rim 34. More particularly, at least a portion of the junction 68 is shown to be disposed between the inner hub 32 and the outer rim 34. In some aspects, the inner hub 32 may define the junction 68 such that the hollow chambers 46 intersect within the inner hub 32. In another aspect, a junction may be a lateral spoke that extends between the spokes 36 and is spaced from the inner hub 32 and the outer rim 34. In yet another aspect, three or more spokes may be in fluid communication with each other at the junction. It is to be appreciated that in some aspects, the hollow chambers 46 may not intersect and are thus fluidly isolated from each other at the inner hub 32.

As shown in FIG. 2B, the hollow chambers 46 of two or more spokes 36 may converge at a location in close proximity to a hub opening 45 of the wheel 26. The spokes 36 may form a V-shaped pair spaced from each other at the outer rim 34 and may intersect with each other at a location 67 between a junction of the spokes 68 and the hub opening 45 of the wheel. Accordingly, the two spokes 36 and the chambers 46 associated with each spoke 36 may be in fluid communication.

The wheel 26 may be formed as an as-cast one-piece construction. It will be appreciated that the wheel 26 being described as as-cast should be understood to mean that the wheel 26 is cast by providing a molten metal material (e.g., a castable material), such as an aluminum alloy or steel, into a mold, allowing the molten material to solidify. In some aspects, further processing, such as welding or machining, may not be necessary to form the hollow spokes 36. However, machining may be performed on the as-cast wheel 26 to, for example, refine openings or to remove material to balance the wheel. In a non-limiting example, it is to be appreciated that the tuning members 42 may be installed onto the wheel once the wheel 26 has been cast and has undergone any finishing processes (e.g., CNC machining) that make the wheel 26 ready for use. The tuning members 42 may be held in place though the methods mentioned throughout the disclosure and/or further may be attached to the opening 48 through use of a bonding agent or an adhesive.

Referring to FIGS. 4A and 4B, the wheel 26 may be provided as an as-cast construction that defines an upper lobe 64 of the hollow chamber 46 that extends radially beyond the outer rim 34 and into the bead seat 38 (as measured from the axis of rotation A1). The upper lobe 64 may be disposed above a centerline L1 defined by the opening 48 of the wheel 26.

Figure 7:
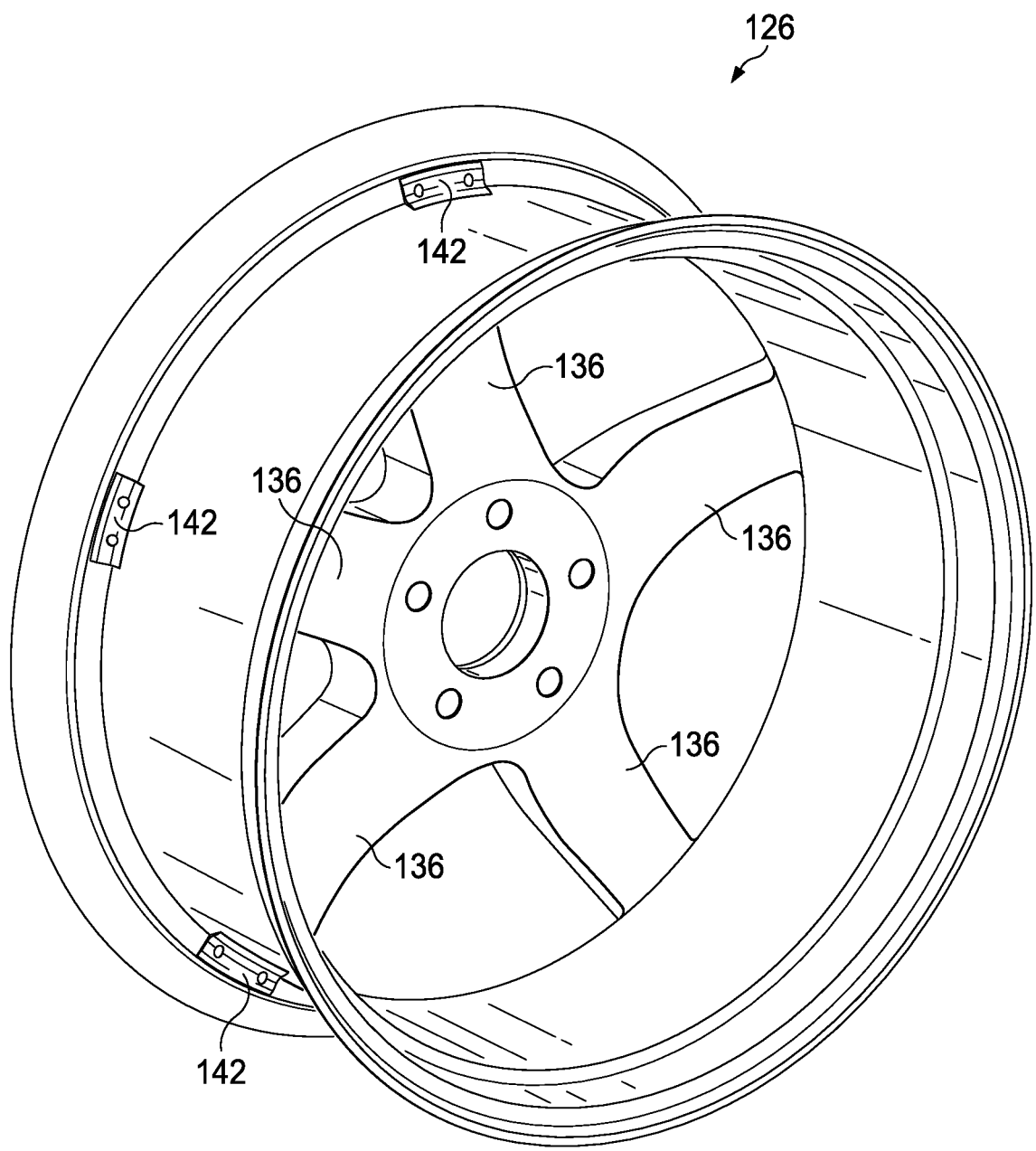
FIG. 7 is an example perspective view depicting a wheel and a plurality of tuning members, in accordance with another aspect of the present disclosure.
Figure 8A:
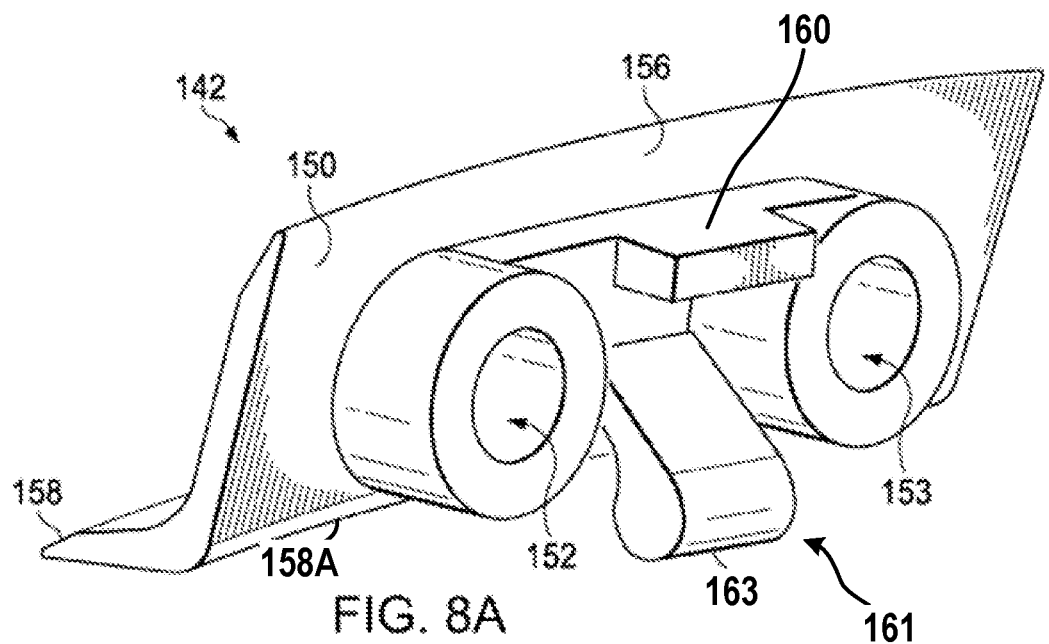
FIG. 8A is a rear perspective view depicting one of the tuning members of the wheel of FIG. 7, in accordance with one aspect of the present disclosure.
Figure 8B:
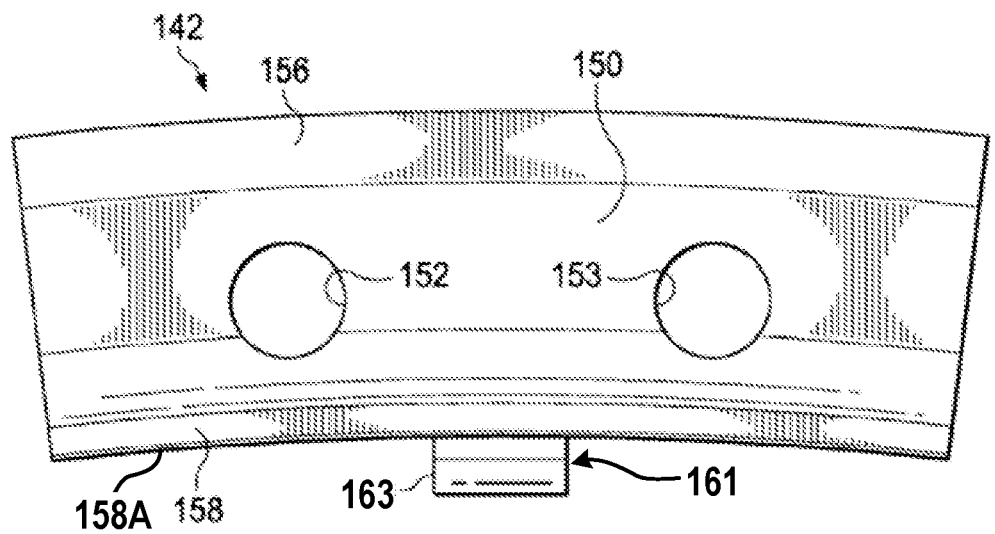
FIG. 8B is an example front view depicting the tuning member of FIG. 8A, in accordance with one aspect of the present disclosure.
Figure 8C:
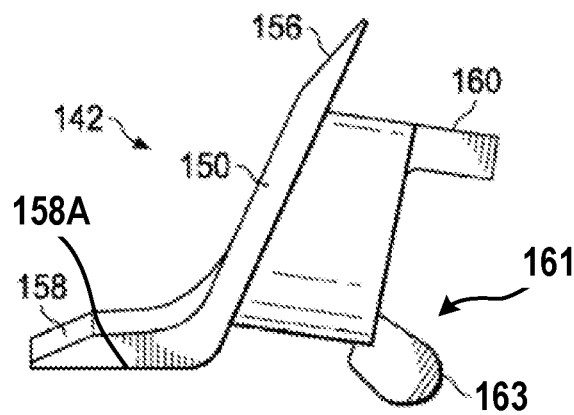
FIG. 8C is a side view depicting the tuning member of FIGS. 8A and 8B.
Figure 9A:
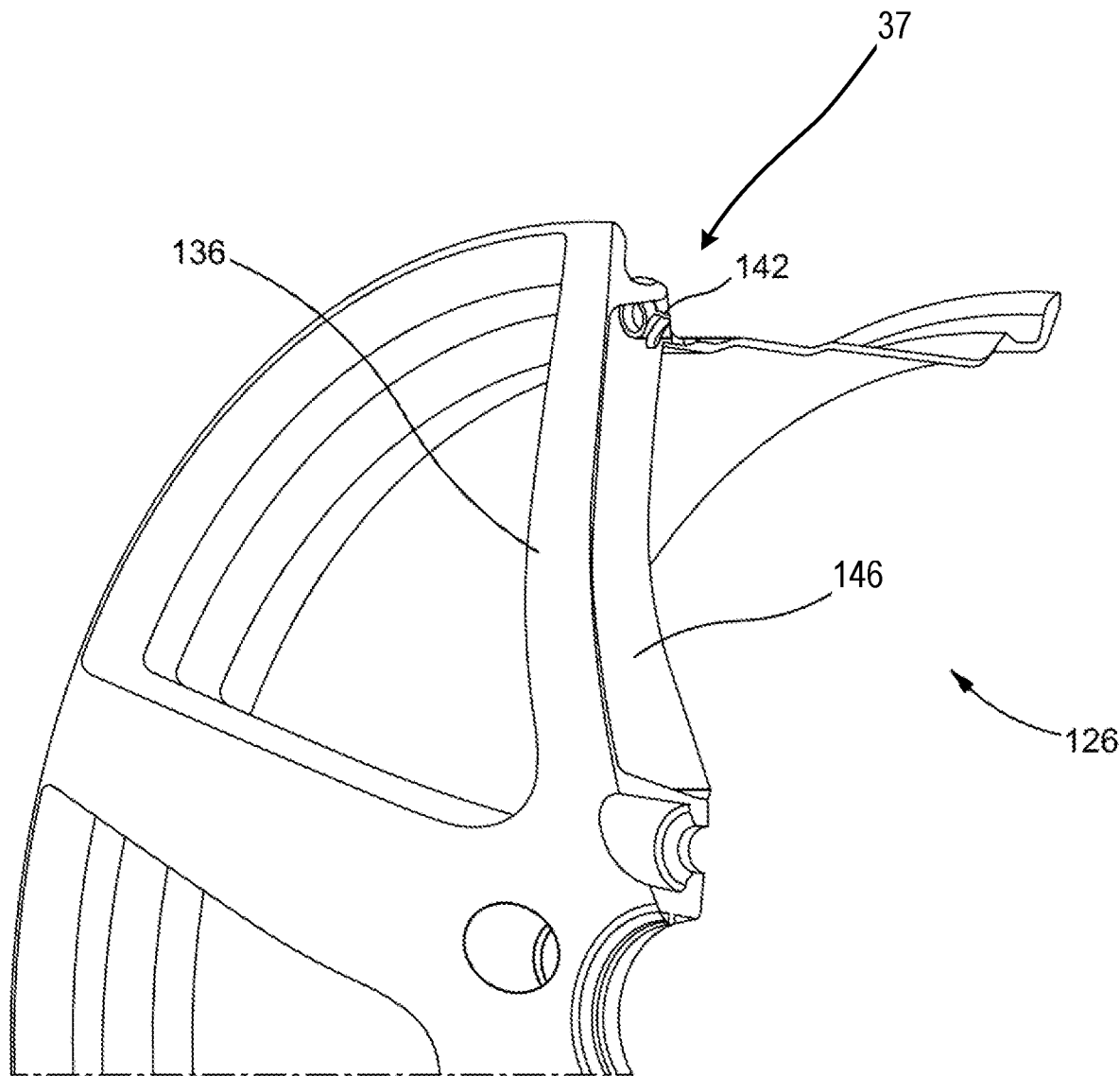
FIG. 9A is an example cross sectional perspective view of a wheel having a tuning member installed in accordance with one aspect of the present disclosure.
Figure 9B:
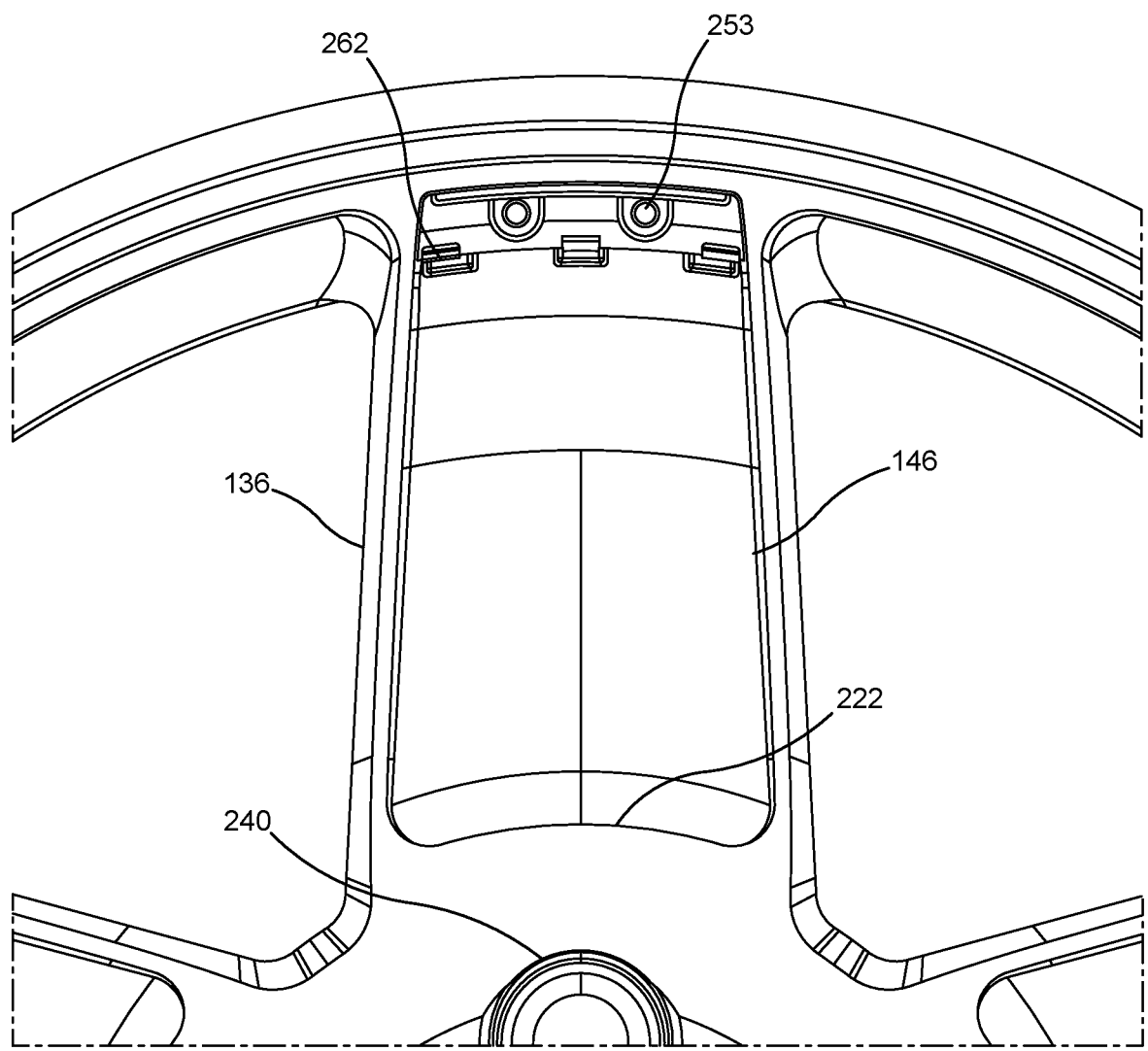
FIG. 9B is an example cross sectional rear view of a wheel in accordance with one aspect of the disclosure.

An alternative aspect of a wheel 126 and a plurality of tuning members 142 is shown in FIGS. 7-9. The wheel 126 and the tuning members 142 may be similar to, or the same as in many respects as, the wheel 26 and the tuning members of FIGS. 1-6. For example, the wheel 126 may include a plurality of spokes 136 that are hollow. Each of the tuning members 142 may be associated with one of the spokes 136. Each of the spokes 136 may include a chamber 146 extending towards a radially central portion of the wheel and ending at a center wall 222. The center wall may extend from each of the lug holes 240. During manufacturing, the distance between the lug holes 240 and the center wall 222 may be optimized to control the geometry of the resonator chamber or may be optimized to balance and/or to provide a desired weight to the wheel. Further the thickness of the material between the lug hole 240 and bottom wall 222 may be varied according to the desired load carrying and strength characteristics of the wheel.

Figure 17:
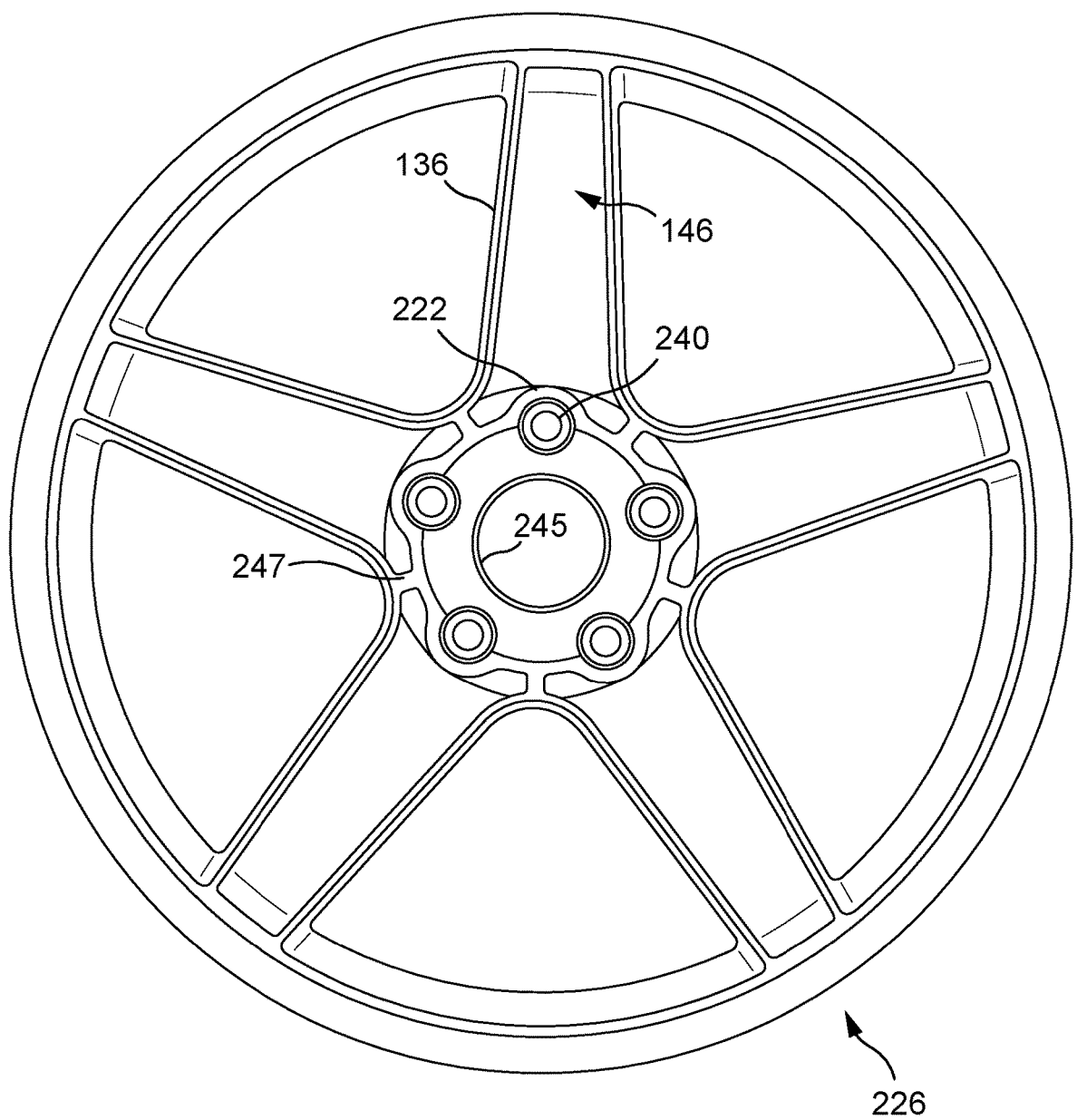
FIG. 17 is an example cut away front view of a wheel, in accordance with another aspect of the disclosure.

As shown in FIG. 17, each of the abovementioned spokes 136 may include a chamber 146 that extends toward the center wall 222. The center wall 222 may be provided so as to conform to and provide a thickness in the material between the center wall 222 and each of the lug holes 240. Further the center wall 222 may be provided so as to conform to and provide a thickness in the material between the hub opening 245 and the center wall 222 defining a bottom portion of the chamber located radially inward toward an axis of the wheel. The wheel may further include a divider portion 247 dividing each of the chambers 146 so as to form an individual chamber corresponding to each spoke 136. Further the divider portions 247 may be omitted between a plurality of spokes 136 so that at least the chambers 146 of two spokes 136 are in fluid communication.

Figure 3C:
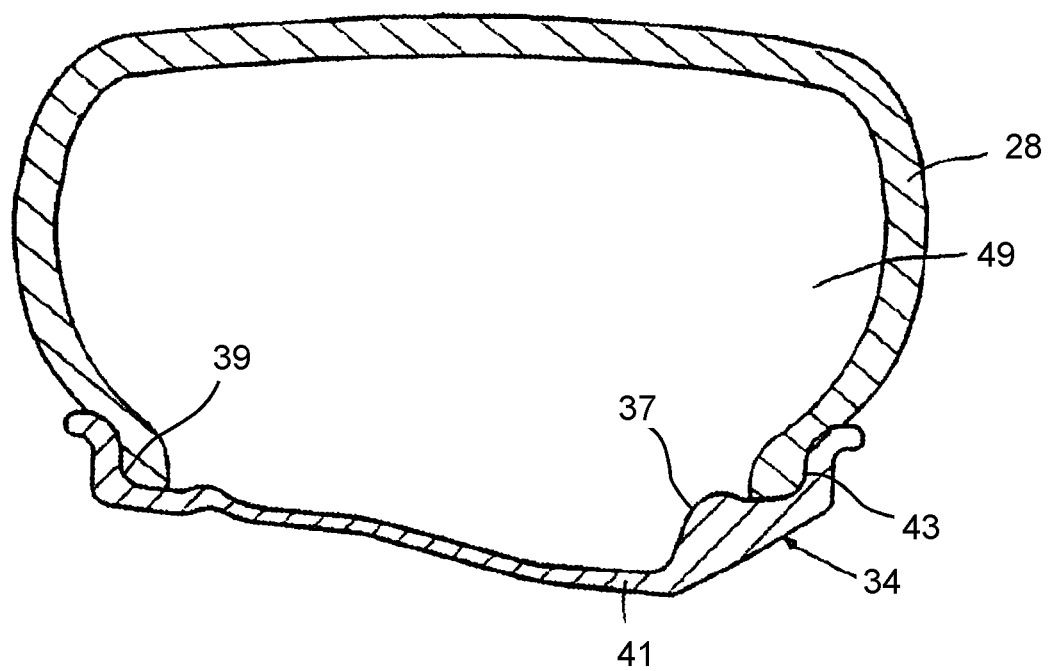
FIG. 3C is a cut away view of a wheel rim as depicted in FIG. 3B, further having a tire installed, in accordance with one aspect of the present disclosure.

As illustrated in FIGS. 7-9, the tuning members 142 may include a body 150 and a base 158. The body 150 includes an inner surface 156 (which may hereinafter be referred to interchangeably as an outer flange) that sealingly engages at least a portion of the wall (an example of which is shown in FIGS. 3B-C, reference 37) surrounding the opening (an example of which is shown in FIGS. 4A-B, reference 48). It is to be understood that an adhesive or sealant may be applied between the inner surface 156 and the outboard wall (see FIG. 4B) to improve the performance of the seal therebetween. The base 158 includes an inner surface 158A (which may hereinafter be referred to interchangeable as an inner flange) that sealingly engages a portion of the drop well (an example of which is shown in FIGS. 3B-C, reference 41) An adhesive or sealant may also be applied between the inner surface 158A and the drop well. The tuning member 142 may include inner tabs 161 and outer tabs 160. Either one or both of the outer and inner tabs 160 and 161 may include a locking feature 163. The locking feature 163 may extend radially outward from abovementioned tabs 160 and/or 161. The body 150 of the tuning member 142 may define one or more through holes 152, 153, as illustrated by in the representative tuning member 142 depicted in FIGS. 7-9.

As illustrated in FIGS. 7-9, the tuning member 142 may be formed of a thermoplastic material, such as polyvinylchloride, for example, an elastomeric material, such as rubber, for example, or any of a variety of suitable alternative non-metallic or metallic materials.

The tuning member 142 may define with a hollow chamber 146 a Helmholtz resonator that effectively attenuates road noise generated during operation of the vehicle 20 (FIG. 1). The tuning member 142 may be tuned through variation of any one of a length of the through hole 152, width of the through hole, volume of the through hole, shape and/or the number of through holes (e.g., the through hole 152 can be sized and/or configured relative to the hollow chamber 146) to effectively attenuate the resonance frequencies generated within the pressurized chamber 149 which might otherwise have an adverse effect on road noise. It will further be appreciated that tuning member 142 may further include a number of openings other than through holes 152 and 153.

The tuning member 142 and through holes 152 and 153 may be dimensioned based on abovementioned formulas 1 and 2. Further the though holes 152 may be dimensioned using the abovementioned methods and/or other methods to effectively attenuate the resonance frequencies generated within the pressurized chamber 149. Through holes 152 and 153 may alternatively be modified as a single though hole or a plurality of through holes. It is to be appreciated that any of a variety of tuning member and/or through hole arrangements are contemplated to achieve effective resonance frequency attenuation. In a non-limiting example, the holes 152 and 153 can be ovals or any other shape sized to provide damping at the resonance frequency. It is also to be appreciated that a wheel can be provided in any of a variety of suitable arrangements (e.g., spoke arrangements) that facilitate resonance frequency attenuation apart from, or in conjunction with a resonator.

Figure 10:
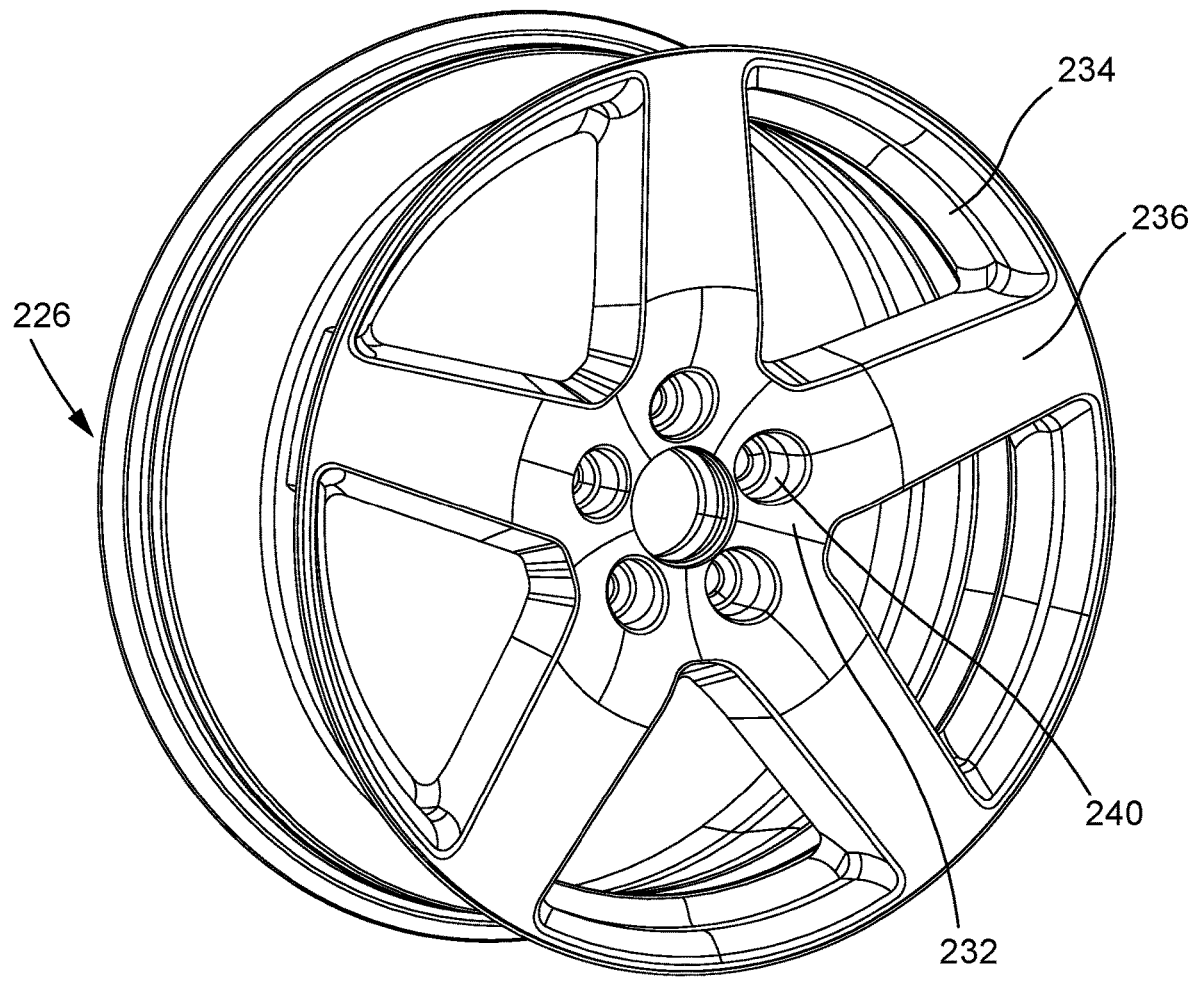
FIG. 10 is an example perspective view depicting a wheel, in accordance with one aspect of the present disclosure.
Figure 11:
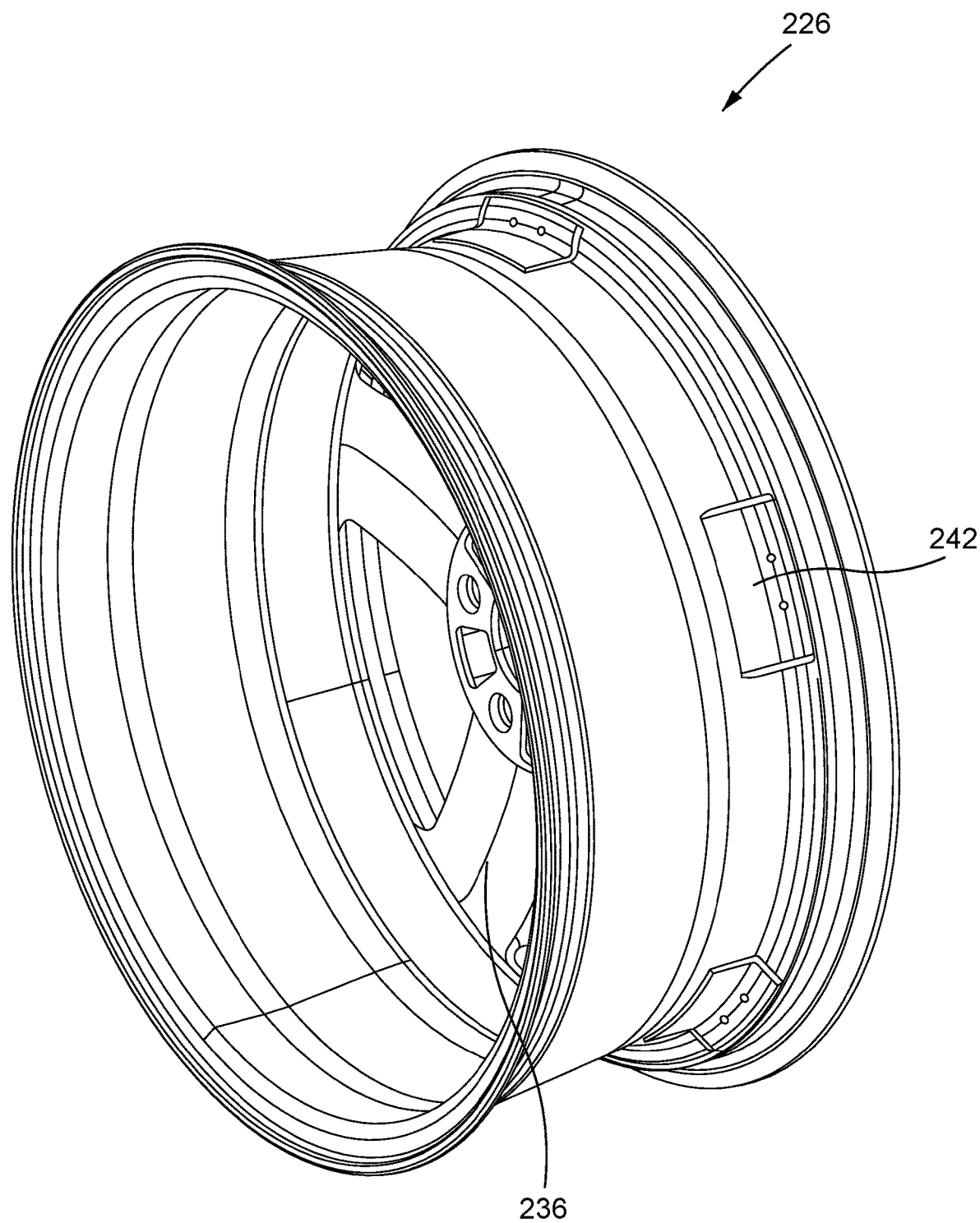
FIG. 11 is an example rear perspective view depicting the wheel of FIG. 10, wherein the wheel is shown to include a plurality of tuning members disposed about a circumference of the wheel, in accordance with one aspect of the present disclosure.

An alternative aspect of a wheel 226 and a plurality of tuning members 242 is shown in FIGS. 10 and 11. The wheel 226 may be similar to, or the same as in many respects as, the wheel 26 or 126 and the tuning members of FIGS. 1-6 and FIGS. 8 and 9. Referring to FIGS. 12-16, the tuning member 242 may comprise a body 250 that defines a through hole 252. The tuning member 242 may further include an outer flange or body 256 having an inner surface 256A (which may hereinafter be referred to interchangeably as a body inner surface) and an inner flange or base 258. The inner flange 258 may further include an inner flange bottom surface 258A (which may hereinafter be referred to interchangeably as a base inner surface). At least one of the inner flange 258, and inner flange bottom surface 258A engage with at least corresponding recessed portions of the wheel proximal to the drop wall and surrounding the opening. For example, as shown in FIGS. 12-16, the inner flange 258 and inner flange bottom surface 258A may sealingly engage with at least recessed portions of the drop wall 550 and 257 respectively. Further, at least one of the inner surface of the body 256A and the body 256 may sealingly engage with the wall portions 259 and 259A respectively. It is to be understood that an adhesive or sealant may be applied between the outer flange 256 and inner flange 258 and the recessed portions of the drop wall 257 and 259 to improve the performance of the seal therebetween. Further, it is to be understood that the abovementioned sealing portions to sealingly engage the tuning member with the wheel may be applied to any of the variations mentioned throughout the disclosure.

Figure 12:
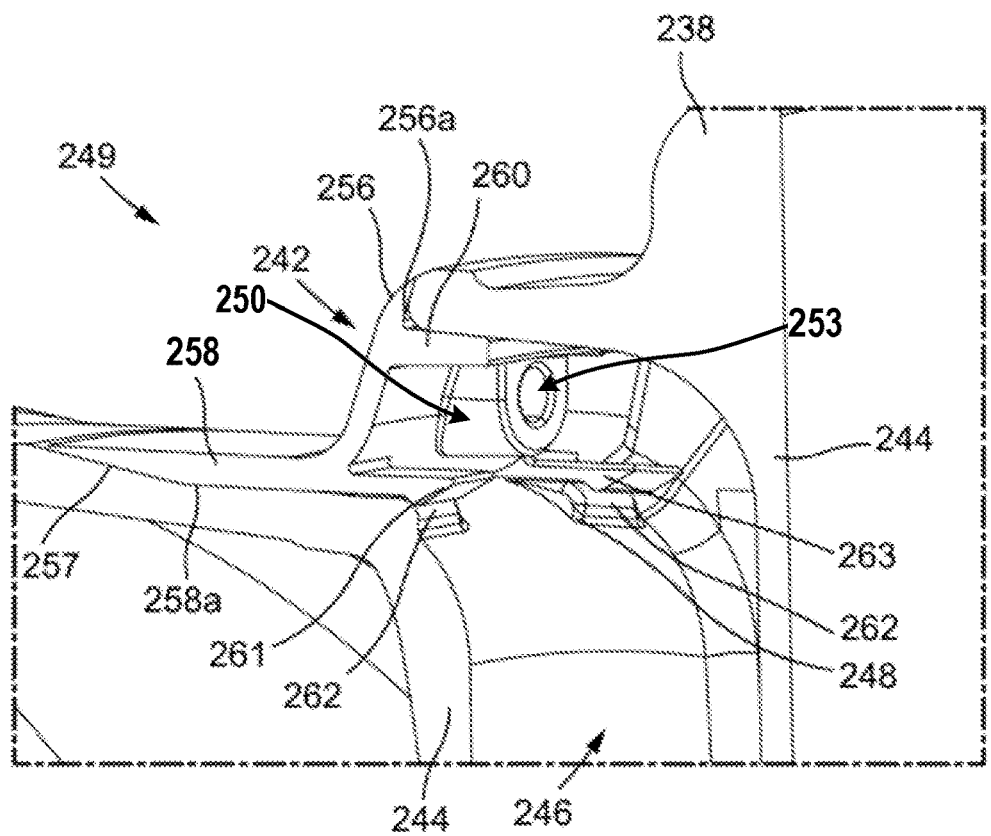
FIG. 12 is an example enlarged perspective cross section view depicting a tuning member releasably coupled to an outer rim, in accordance with one aspect of the present disclosure.
Figure 13:
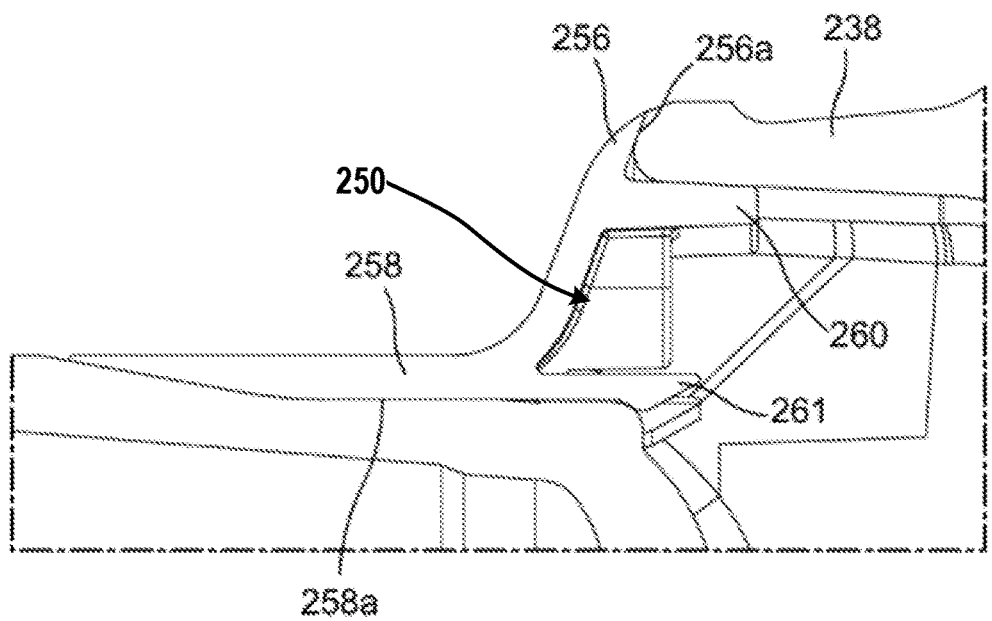
FIG. 13 is an example enlarged cross section view depicting a tuning member releasably coupled to an outer rim, in accordance with one aspect of the present disclosure.

The inner flange 258 may fill a recessed portions 257 and 259 in the wall 244. The outer flange 258 may be contoured to the bead seat 238 or to an upper recessed portion 255 best seen in FIG. 16. The outer and inner flanges 256 and 258 may interact with respective surfaces of the recessed portions 257, 259 and/or 255 when the tuning member 242 is inserted into the opening 248, as illustrated in FIGS. 12-13. The tuning member 242 may include an outer tab 260 and an inner tab 261 and may exert an outward force upon the wall 244 to hold the tuning member 242 in place. Tabs 260 and/or 261 may be a single tab or be comprised of a plurality of tabs. Further, a locking feature 263 may be located on either one of or both of tabs 260 and 261. The locking feature may extend radially outward from abovementioned tabs 260 and/or 261. The locking feature and/or tabs may be angled such that when the tuning member 242 is inserted into the opening 248, the locking feature 263 located on either one of or both of 260 and 261 may exert an outward force upon the wall 244 to hold the tuning member 242 in place. The wall portion 244 may further include a single or a plurality of ridged portions 262. The ridged portions 262 may protrude from the wall portion 244 such that a locking feature 263 of the tuning member 242 interacts with the ridge portion 244 when the tuning member 242 is installed into the wall opening 248.

Figure 14:
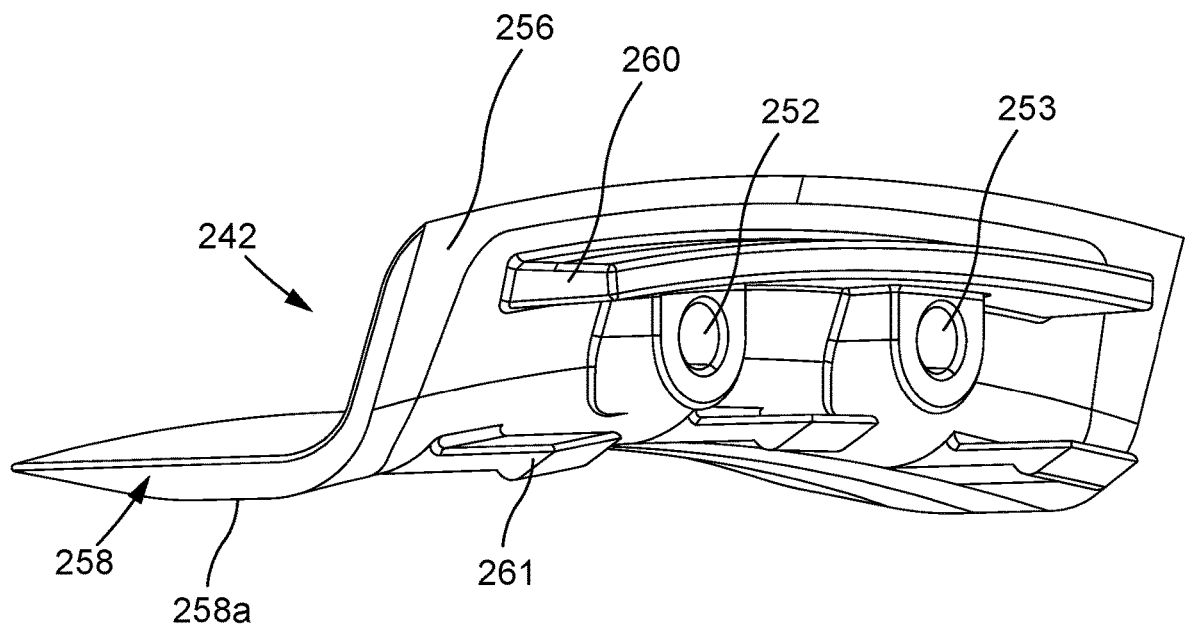
FIG. 14 is an example perspective view depicting the tuning members of FIGS. 11-13, in accordance with one aspect of the present disclosure.
Figure 15:
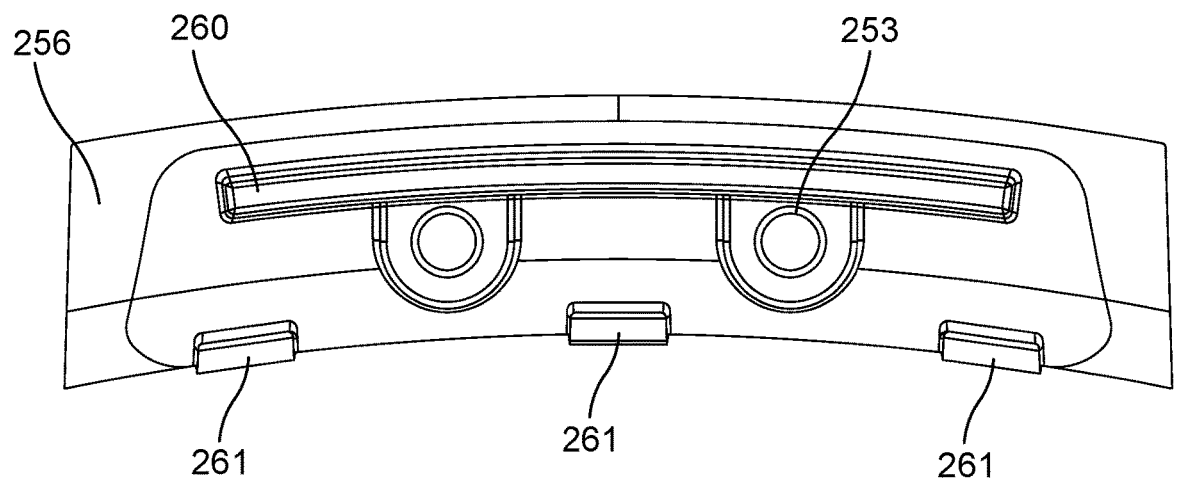
FIG. 15 is an example rear view depicting the tuning member of FIGS. 11-14, in accordance with one aspect of the present disclosure.
Figure 16:
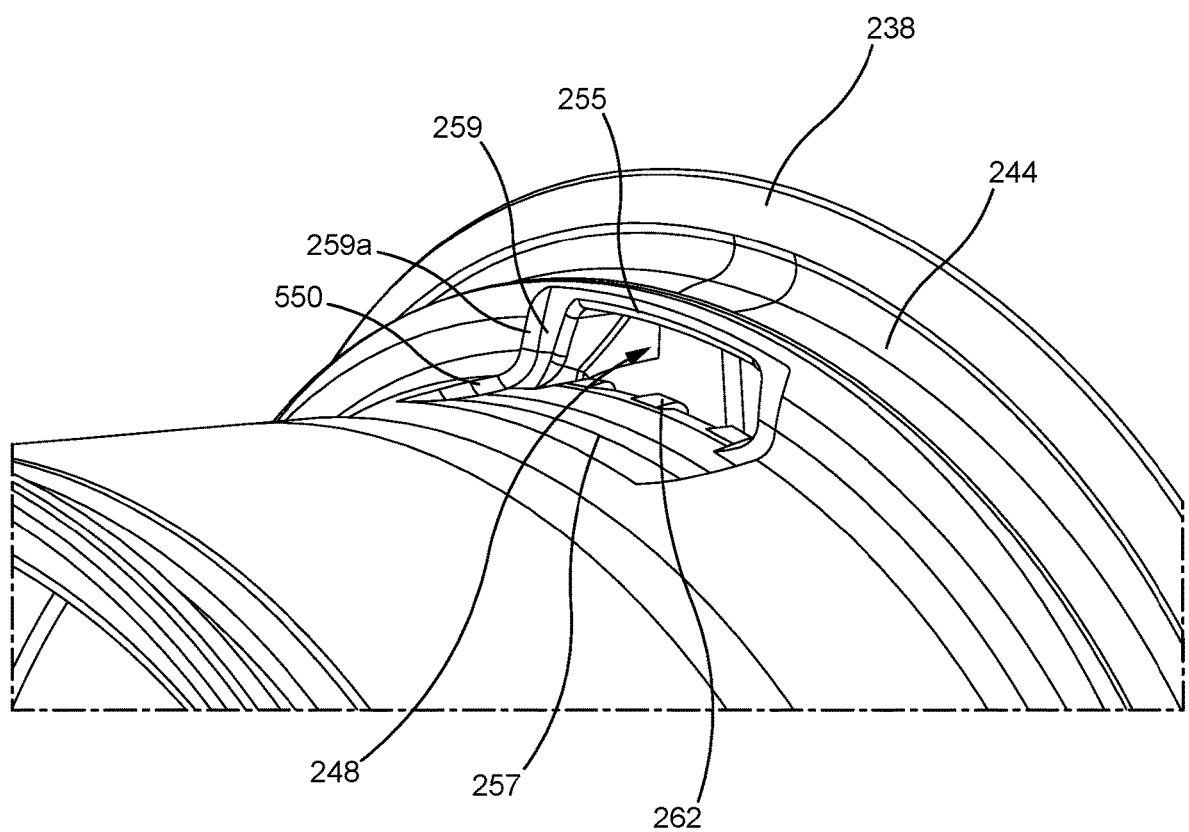
FIG. 16 is an example close up perspective view of a wheel opening, in accordance with another aspect of the disclosure.

As illustrated in FIGS. 14 and 15, the tuning member 242 may be formed of a thermoplastic material, such as polyvinylchloride, for example, an elastomeric material, such as rubber, for example, or any of a variety of suitable alternative non-metallic or metallic materials.

The tuning member 242 and a hollow chamber 246 at least partially define a Helmholtz resonator that effectively attenuates road noise generated during operation of the vehicle 20 (FIG. 1). The tuning member 242 may be tuned through variation of any one of a length of the through holes 252 and 253, width of the through hole, volume of the through hole, shape and/or the number of through holes (e.g., the through hole 252 and/or 253 can be sized and/or configured relative to the hollow chamber 246) to effectively attenuate the resonance frequencies generated within the pressurized chamber 249 which might otherwise have an adverse effect on road noise. The tuning member 242 may further include a plurality of openings.

The tuning member 242 and through holes 252 and 253 may be dimensioned based on abovementioned formulas 1 and 2. Further the though holes 252 may be dimensioned using other methods to effectively attenuate the resonance frequencies generated within the pressurized chamber 249. Through holes 252 may be modified to include a single through hole or a plurality of through holes. It is to be appreciated that any of a variety of tuning member and/or through hole arrangements are contemplated to achieve effective resonance frequency attenuation. In a non-limiting example, the holes 252, 253 may be ovals or any other shape sized to provide damping at the resonance frequency. It is also to be appreciated that a wheel can be provided in any of a variety of suitable arrangements (e.g., spoke arrangements) that facilitate resonance frequency attenuation apart from, or in conjunction with a tuning member.

The foregoing description of various aspects and examples of the invention have been presented for purposes of illustration and description. It is not intended to be exhaustive nor to limit the invention to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the invention and various aspects as are suited to the particular use contemplated. The scope of the invention is, of course, not limited to the examples or aspects set forth herein, but can be employed in any number of applications and equivalent devices by those of ordinary skill in the art. Rather, it is hereby intended the scope of the invention be defined by the claims appended hereto.

What is claimed is:

1. A vehicular wheel assembly defining an axis of rotation, the wheel comprising:
   an inner hub;
   an outer rim defining an outer circumference and an opening, wherein the opening is at least partially defined by a wall;
   a tire defining an air cavity with the outer rim;
   a spoke extending between the inner hub and the outer rim, the spoke comprises a spoke wall that at least partially defines a hollow chamber that extends to the opening; and a tuning member that obstructs the opening and at least partially defines a through hole that has a smaller cross sectional area than the opening, the hollow chamber of the spoke is in fluid communication with the air cavity by way of the through hole, wherein the tuning member and the hollow chamber at least partially define a Helmholtz resonator wherein the tuning member includes a body that includes an inner surface and an outer surface, the body defines the through hole, and a portion of the inner surface of the body engages the wall to at least partially form a sealed perimeter around the opening.

2. The vehicular wheel assembly of claim 1, wherein the outer rim comprises an outboard flange including a bead seat, a drop well positioned inboard of the outboard flange, and the wall is positioned inboard of the bead seat that extends from the bead seat to the drop well.

3. The vehicular wheel assembly of claim 2, wherein the tuning member includes a cylindrical member extending from the inner surface of the body and into the hollow chamber, and the through hole extends through the cylindrical member and the body.

4. The vehicular wheel assembly of claim 3, wherein the tuning member includes a base extending inboardly away from the body, the base includes an inner surface, and the inner surface of the body engages the wall and the inner surface of the base engages a portion of the drop well that extends inboardly away from the wall to form the sealed perimeter around the opening.

5. The vehicular wheel assembly of claim 4, wherein the outboard flange includes an inner wall that partially defines the hollow chamber, the tuning member comprises a clip including a fixed leg that extends from the inner surface of the body, and a flexible leg that extends from the inner surface of the body and engages one of the walls defining the hollow chamber to bias the fixed leg against the inner wall of the outboard flange.

6. The vehicular wheel assembly of claim 2, wherein the outboard flange includes an inner wall that partially defines the hollow chamber, and wherein the body includes a locating feature that extends from the inner surface, and the body includes a flexible member extending from the inner surface that engages a portion of the spoke wall to bias the locating feature against the inner wall of the outboard flange.

7. The vehicular wheel assembly of claim 6, wherein the wheel comprises a plurality of hollow spokes, wherein each of the inner hub, the outer rim, and the plurality of hollow spokes are comprised of a metal material as an as-cast one-piece construction, and the outboard flange is solid.

8. The vehicular wheel assembly of claim 1, wherein the outer circumference of the outer rim comprises a plurality of openings, wherein the vehicular wheel further comprises:
a second spoke having a second spoke wall that at least partially defines a second hollow chamber, wherein the spoke wall and the second spoke wall of the spoke and second spoke converge so that the hollow chamber and the second hollow chamber of the spoke and second spoke are in fluid communication.

9. The vehicular wheel assembly of claim 1, wherein the opening defines a first diameter;
the through hole defines a second diameter; and
the ratio of the second diameter to the first diameter is 1:10 to 1:2.

10. A tuning member for use in a vehicular wheel assembly comprising:
a body having an inner surface, and outer surface, a first edge and a second edge opposite the first edge;
a first flange portion extending from the inner surface along the first edge of the body;
a second flange portion extending from the second edge at an obtuse angle in relation to the first flange portion;
at least one first tab portion extending from the first edge in a direction opposite the first flange portion;
at least one second tab portion extending substantially parallel to said first tab portion; and
at least one through hole portion in the body, the through hole portion having an axis substantially parallel to said first and second tab portions.

11. The tuning member of claim 10, wherein at least one of the first and second tab portions have a locking feature protruding from a surface of said tab portion.

12. The tuning member of claim 11, wherein a distance between the first and second tabs defines a first diameter; each of the at least one through hole portions defines a second diameter; and the ratio of the second diameter to the first diameter is 1:10 to 1:2.

13. The tuning member of claim 10, wherein the through hole comprises a plurality of holes.

14. The tuning member of claim 10, wherein at least one of the first tab portion and the second tab portion comprises a plurality of tabs.

15. The tuning member of claim 10, wherein the first tab portion comprises a plurality of tabs and the second tab portion is a single tab.

16. A vehicular wheel assembly defining an axis of rotation, the vehicular wheel assembly comprising a wheel, the wheel comprising:
an inner hub;
an outer rim defining an outer circumference; and
a plurality of hollow spokes, each hollow spoke of the plurality of hollow spokes extending between the inner hub and the outer rim; wherein:
each hollow spoke comprises a spoke wall that at least partially defines a hollow chamber;
the outer rim defines a plurality of openings at least partially defined by a wall; and
each of the inner hub, the outer rim, and the plurality of hollow spokes are comprised of a metal material as a one-piece construction;
a plurality of tuning members, each tuning member of the plurality of tuning members comprising:
a body that includes an inner surface and an outer surface, and that defines at least one through hole; wherein each tuning member is coupled with the outer rim at one of the openings such that each of the at least one through holes of each tuning member is in fluid communication with one of the hollow chambers by way of one of the openings and wherein a portion of the inner surface of each tuning member of the plurality of tuning members engages the wall to at least partially form a sealed perimeter around one opening of the plurality of openings.

17. The vehicular wheel assembly of claim 16, wherein each of the inner hub, the outer rim, and the plurality of hollow spokes are comprised of a first material and each tuning member is comprised of a second material that is different from the first material.

18. The vehicular wheel assembly of claim 16, wherein the wheel assembly comprises an outboard flange including a bead seat, a drop well positioned inboard of the outboard flange, and the wall is positioned inboard of the bead seat that extends from the bead seat to the drop well, and wherein the opening of the outer rim is at least partially defined by the wall.

19. The vehicular wheel assembly of claim 18, wherein each tuning member of the plurality of tuning members further comprises a base extending inboardly away from the body, the base includes an inner surface, and the inner surface of the body engages the wall and the inner surface of the base engages a portion of the drop well that extends inboardly away from the wall to form the sealed perimeter around the opening.

20. The vehicular wheel assembly of claim 16, further comprising an outboard flange that includes an inner wall that partially defines the hollow chamber, wherein the body of each of the plurality of tuning members comprises a locating feature that extends from the inner surface, and the body further includes a flexible member extending from the inner surface that engages a portion of the spoke wall to bias the locating feature against the inner wall of the outboard flange.

* * * * *